(12) United States Patent
Golding et al.

(10) Patent No.: US 8,467,107 B2
(45) Date of Patent: Jun. 18, 2013

(54) DUPLEXING DOCUMENT HANDLER WITH DEFECT REDUCTION

(75) Inventors: Paul Simon Golding, Hertford (GB); Michael John Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 754 days.

(21) Appl. No.: 12/634,001

(22) Filed: Dec. 9, 2009

(65) Prior Publication Data

US 2011/0134491 A1    Jun. 9, 2011

(51) Int. Cl.
*H04N 1/38* (2006.01)
*H04N 1/403* (2006.01)
*H04N 1/193* (2006.01)

(52) U.S. Cl.
USPC .............................. 358/453; 358/464; 358/475

(58) Field of Classification Search
None
See application file for complete search history.

(56) References Cited

U.S. PATENT DOCUMENTS

| | | | |
|---|---|---|---|
| 5,528,288 A * | 6/1996 | Sandor et al. | 348/97 |
| 6,556,315 B1 * | 4/2003 | Kommrusch et al. | 358/473 |
| 7,440,151 B2 * | 10/2008 | Fukuzawa | 358/509 |

* cited by examiner

*Primary Examiner* — Barbara Reinier
(74) *Attorney, Agent, or Firm* — Ronald E. Prass, Jr.; Prass LLP (57) ABSTRACT

According to aspects of the embodiments, there is provided methods and systems for correcting illumination defects in document handlers. A document handler successively moves an image-bearing sheet past an image sensor, when the edges of the document passes over the edge guide near a constant velocity transport roll the document tends to flick down onto the image sensor causing a lightness change at the edges. The proposed correction is dynamically adjusting the light source or dynamically adjusting the automatic gain control (AGC) of the imaging sensor. The method comprises characterizing an optical signal reflected from an image-bearing sheet as it passes a scan window, determining the illumination defects in at least one edge region based on the reflected signal, and adjusting the gain of the imaging sensor or the light level during receipt of the optical signal.

20 Claims, 8 Drawing Sheets

DUPLEXING DOCUMENT HANDLER WITH DEFECT REDUCTION

BACKGROUND

The disclosure relates generally to a scanning system, and more particularly concerns the correcting of illumination defects.

Conventional automatic duplex documents sheet handling and imaging systems have increased the effective imaging, scanning, or copying rate for both sides of sets of duplex documents. Such conventional automatic document handlers automatically sequentially feed and image a set or job of plural duplex document sheets, while at the same, these conventional document handlers are capable of feeding and copying simplex documents. A variety of systems and methods are conventionally used in the scanning operation. In a typical scanning operation, light from the scanner illuminates the surface of an original document and the document moving past an image sensor detects the intensity of light reflected from each location in the image and stores it as a proportionate electrical charge at a corresponding pixel location. Various exemplary scanning devices employ stationary Full-Width Imager Arrays (FWA) or linear Charge-Coupled Device (CCD) arrays. In such systems in which the imaging arrays are stationary, the arrays are often separated from the image to be scanned by a platen glass or other transparent surface or lens overlying the imaging array.

Document handlers employ various exemplary methods to move the original document to the transparent surface. One such exemplary method, commonly referred to as Constant Velocity Transport (CVT) scanning, employs a belt, roll, drum or other like device to move the image substrate to be scanned across a linear sensor, such as, for example, a Full-Width Imager Arrays (FWA). One or more scanners, printers, video displays and/or computer storage devices are often connected via a communications network, thereby providing a digital reproduction system. For example, a digital copier may incorporate a scanner and a digital printer.

A difficulty in such systems is that any defect or imperfection is repeatedly scanned and digitized. One such difficulty encountered in document handlers when the lead or trail edge of a document passes past the imaging sensor in a scanner. When the edges of the paper pass over the edge guide near the constant velocity transport (CVT) roll, the paper springs away from the normal path. The resulting change in illumination angle or integrating cavity effect (ICE) causes a lightness change near the edge of the document. When the document is reproduced, the output image will include a change in light level leading to a visual lightness defect corresponding with the position of the imperfection.

For the reasons stated above, and for other reasons stated below which will become apparent to those skilled in the art upon reading and understanding the present specification, there is a need in the art for correction of lightness change during the scanning operation.

SUMMARY

The disclosure relates to method and system for correcting illumination defects in document handlers. A document handler successively moves an image-bearing sheet past an image sensor, when the edges of the document passes over the edge guide near a constant velocity transport roll the document tends to flick down onto the image sensor causing a brightness change at the edges. The proposed correction is dynamically adjusting the light source or dynamically adjusting the automatic gain control (AGC) of the imaging sensor. The method comprises characterizing an optical signal reflected from an image-bearing sheet as it passes a scan window, determining the illumination defects in at least one edge region based on the reflected signal, and adjusting the gain of the imaging sensor or the light level based on document position to compensate for the defect.

DETAILED DESCRIPTION

Aspects of the disclosed embodiments relate to a method to correct illumination defects by a scanning assembly in a recirculation document handler for repeatedly presenting documents to the platen of a copier comprising: measuring illumination intensity on a document as it moves across the scanning assembly, wherein the scanning assembly includes housing with a light source disposed in a cavity; acquiring illumination intensity of at least one edge region of the document, wherein the scanning assembly causes illumination defects on the at least one edge region of the document; determining the illumination defects in at least one edge region based on the measured illumination intensity of the document and the acquired illumination intensity of the at least one edge; and applying illumination defect correction to scans performed by the scanning assembly based on the determined illumination defects.

In another aspect, illumination defect correction is selecting at least one gain control and adjusting brightness at the light source. Alternatively the automatic gain control (AGC) correction is applying a plurality of gain corrections to an optical detector in the scanning assembly, each gain correction corresponding to one of the at least one edge region. The gain correction involves recalling a stored gain correction and applying the gain correction to a corresponding at least one edge region.

In still another aspect, an automatic document handling system having an imaging area; a light source located in proximity to the imaging area; an imaging scanning system located in proximity to the imaging area; a looped document path, located in proximity to said imaging area, having an entrance and an exit; the exit of the looped document path being positioned such that an exiting document is placed upon the imaging area a second time; a memory that stores executable instructions capable of directing a processor to correct illumination defects; and a processor that executes the executable instructions to correct the illumination defects when receiving a print command by: acquiring data about illumination defects in at least one edge region of the document and applying illumination defect correction to scans performed by the imaging scanning system based on the acquired data about illumination defects.

In yet another aspect, the document handler adjusts the gain of the optical detector within a defined distance of a leading edge or a trailing edge on the document. The document handler is programmed to compensate for illumination defect such as lightness change due to deviation from a normal path by the document when the deviation causes a change in an angle of illumination formed between the document and the light source.

In still another aspect, a automatic document handling system is disclose comprising an imaging area; a light source located in proximity to the imaging area; an imaging scanning system located in proximity to the imaging area; a looped document path, located in proximity to said imaging area, having an entrance and an exit; a computer-accessible medium having executable instructions to correct illumination defects, the executable instructions capable of directing a processor to perform: measuring illumination intensity on a document as it moves across the imaging scanning system, wherein the scanning assembly includes housing with the light source disposed in a cavity; acquiring illumination intensity of at least one edge region of the document, wherein illumination defects on the at least one edge region of the document are caused by the document springing away from a normal path; determining the illumination defects in at least one edge region based on the measured illumination intensity of the document and the acquired illumination intensity of the at least one edge; applying illumination defect correction to scans performed by the scanning assembly based on the determined illumination defects; wherein applying illumination defect correction to scans performed by the imaging scanning system is selecting at least one of applying automatic gain control (AGC) correction to the imaging scanning system, and adjusting brightness at the light source.

Embodiments as disclosed herein may also include computer-readable media for carrying or having computer-executable instructions or data structures stored thereon for operating such devices as controllers, sensors, and eletromechanical devices. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

The term "image", as used in this disclosure refers to a graphic or plurality of graphics, compilation of text, a contone or halftone pictorial image, or any combination or subcombination thereof, that is capable of being output on a display device, a marker and the like, including a digital representation of such image.

The term "Document" and an "image-bearing sheet" generally refers to a usually flexible, sometimes curled, physical sheet of paper, plastic, or other suitable physical print media substrate for images, whether precut or web fed.

The term "document handler" as used herein refers to a digital copier or printer, image printing machine, image reproduction machine, bookmaking machine, facsimile machine, multi-function machine, or the like and can include several marking engines, feed mechanism, scanning assembly as well as other print media processing units, such as paper feeders, finishers, and the like.

The term "edge" refers to the boundary of a document. The term "edge region" refers to an area defined by the boundary of the document. The term "corner" refers to the point of intersection of two edges. The "leading edge" of a document is the first captured edge of the document, which lies parallel to an image sensor.

The "scanning surface" is the entire surface that is illuminated and captured during scanning, typically a glass platen located next to an image sensor.

"Scan area" refers to the entire area that is captured by the scanner, which includes the document bearing an image and the scanner background.

Figure 1:
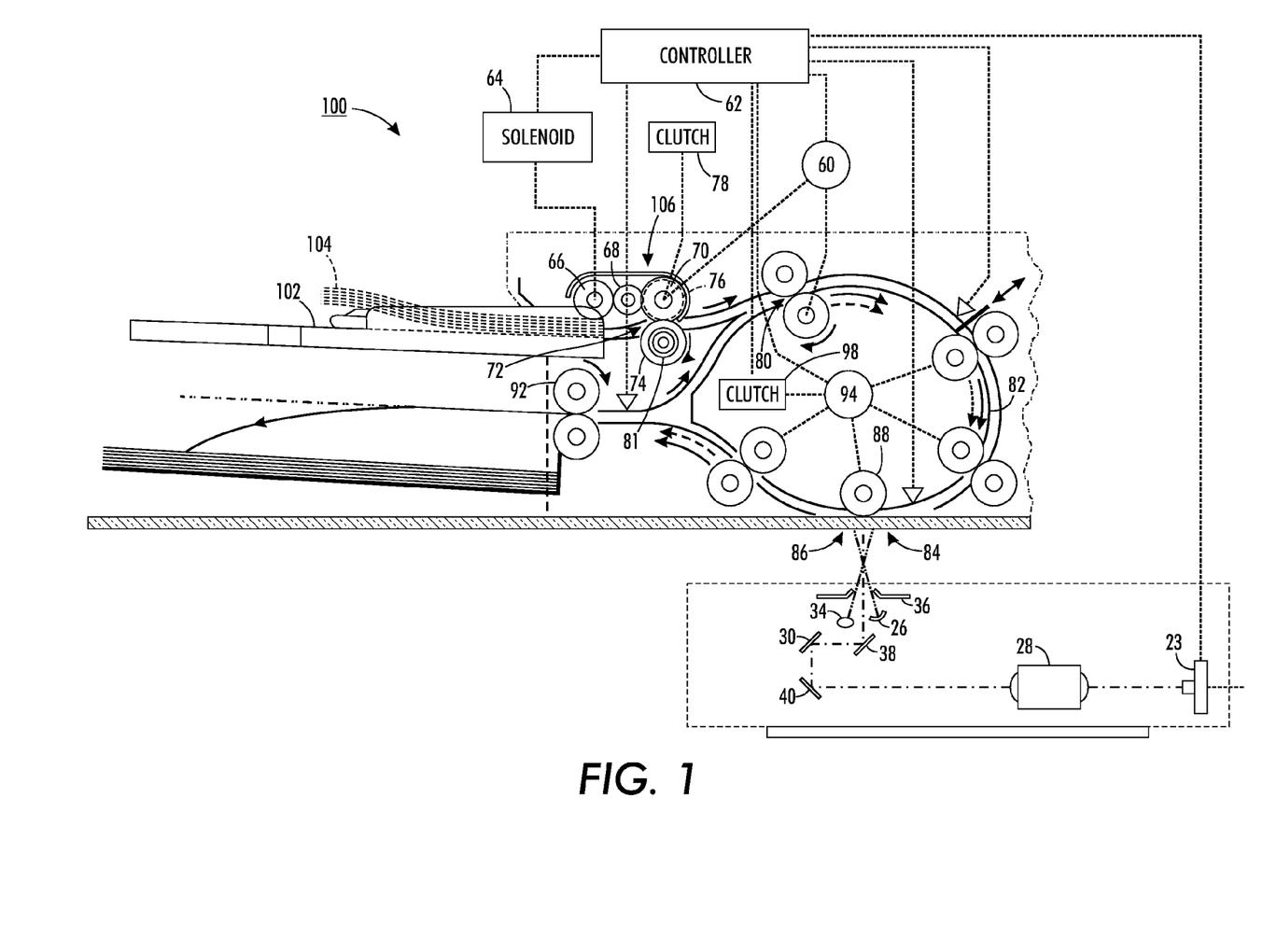
FIG. 1 is a schematic elevation view of a document handler that incorporates an input scanner in accordance to an embodiment.

FIG. 1 schematically illustrates an image reproduction machine 100 that generally employs a belt 10 mounted on a belt support module 90. FIG. 1 there is shown is a schematic elevation view of one embodiment of the document handler 100 that incorporates input scanner such as a raster input scanner ("RIS") 24 and the like. The document handler 100 has a document sheet stacking input tray 54 in which the document to be imaged are stacked. The top sheets from the sheets stacked in that tray 54 are sequentially fed from the tray 54 with a semi-active retard type sheet separator-feeder system 58 driven by a motor 60 and conventionally controlled by a controller 62. Controller 62 may be independent as shown or can be incorporated into other parts of the document handler. In the separator-feeder system 58, a sheet is separated from its underlying sheets, first by intermittent engagement (actuated by a solenoid 64) of the top sheet by nudger roll 66 (driven by gear 68 driven off the drive of the feed roller 70). Overlapping sheets are then separated in a feeder—retard nip 72. The feeder—retard nip 72 here is defined by an underlying retard (drag) roller 74 engaged by an intermittently driven feed roller 70. The sheet is then fed downstream by the feed roller 70 driven by a drive system 76 connection to motor 60, via the clutch 78 schematically indicated, to a driven takeaway roller nip 80 (which may also have a sheet acquisition sensor). The retard roller 74 may be torque biased for retarding sheets by an internal drag wrap spring 81. The document sheet that has been separated and fed out is fed downstream in a document feeding and inverting loop path 82 to the imaging station 84 which is a small area of the upper surface of the stationary platen glass 86, against which the moving document is held down by a roller 88, while the document is being sequentially imaged through the platen glass 86 by the imager, here the "RIS" (raster input scanner) 24. After scanning, the document may be ejected by exit rolls 92 into the illustrated output tray or, if it is a duplex document, inverted and fed back through path 82 with the clutch 98 shown connecting to reverse the exit rolls 92 for imaging its second side. Although the document handler 100 of the xerographic processing or printing section has been described in detail above, features of the present invention could be used with other types of xerographic processing or printing sections having any suitably blank paper or sheet supply, created document output, image transfer system or paper path. The description above is merely intended to be exemplary. More or less features could also be provided. Although retard type sheet separator-feeder system 58 is shown at a fixed position, this position is intended to be exemplary and various alternative locations and modifications can be devised by those skilled in the art without departing from the invention. Such an alternative, for example, could be incorporating retard type sheet separator-feeder system 58 into the retard type sheet separator-feeder system 24 or 52. An additional alternative, for example, would be incorporating belts instead of rollers within separator-feeder system 58.

The scanning assembly or RIS 24 comprises one or more photosensitive linear arrays 23 supported for reciprocating scanning movement below platen 86. A RIS 24 includes several optical components which move together as a single unit. These typically include a light source 34 such as a fluorescent lamp, an associated reflector 26, and a baffle 36, with the latter two elements cooperating to direct a narrow band of light onto a small area across the platen. Also included in the assembly are lens 28, and mirrors 30, 38 and 40, which operate together to focus the illuminated segment of platen 86 and the document being scanned thereon, onto array 23. Array 23 produces image signals or pixels representative of the image on the surface of document. These pixels are output to a display or storage device such as disk 70 in FIG. 2. The entire scanning system assembly is enclosed by cavity 24. Array 23 is communication with controller 62. The controller may take a variety of suitable forms and may reside within the cavity 24 or outside the cavity 24. Further, the controller 62 may be incorporated within the scanner or may reside on a system controlling the scanner. Scanning array 23 may be a linear array of photosensitive sensors such as CCD's or photodiodes which are controlled to sense light reflected from a document during the illumination period. The photosensitive sensors develop a charge indicative of the amount of light detected, for transmission to an image processor for use in assimilating an electronically stored representation of an image contained in document. Scanning array 23 extends in a direction transverse to that of the motion of the carriage. The example is instructive of the type of scanning technology used but not limited to this technology as indicated earlier with Contact Image Sensors and Full Width Array configurations.

The reflector lamp assembly, the light source 34, reflector 26, and baffle 36 serve as an integrating cavity. A fraction of the light hitting the document is reflected back into the reflecting cavity. This light bounces back and forth. On each bounce, the light is more dispersed (in position) and less of it remains, as some is absorbed by the document or misses the mirror 30, 38, 40. Moreover, other undesired reflections and bounces of light that impact the sensing or imaging of the image may occur within the cavity 50 to contribute to the integrating cavity effect (ICE). Additionally, the integrating cavity effect is also created by the flexibility of the document, especially at the leading and trailing edges, because the document has a tendency to spring away from its normal path leading to a change in the illumination angle. The springiness of the document causes a predictable and measurable lightness change near these edges.

Figure 2:
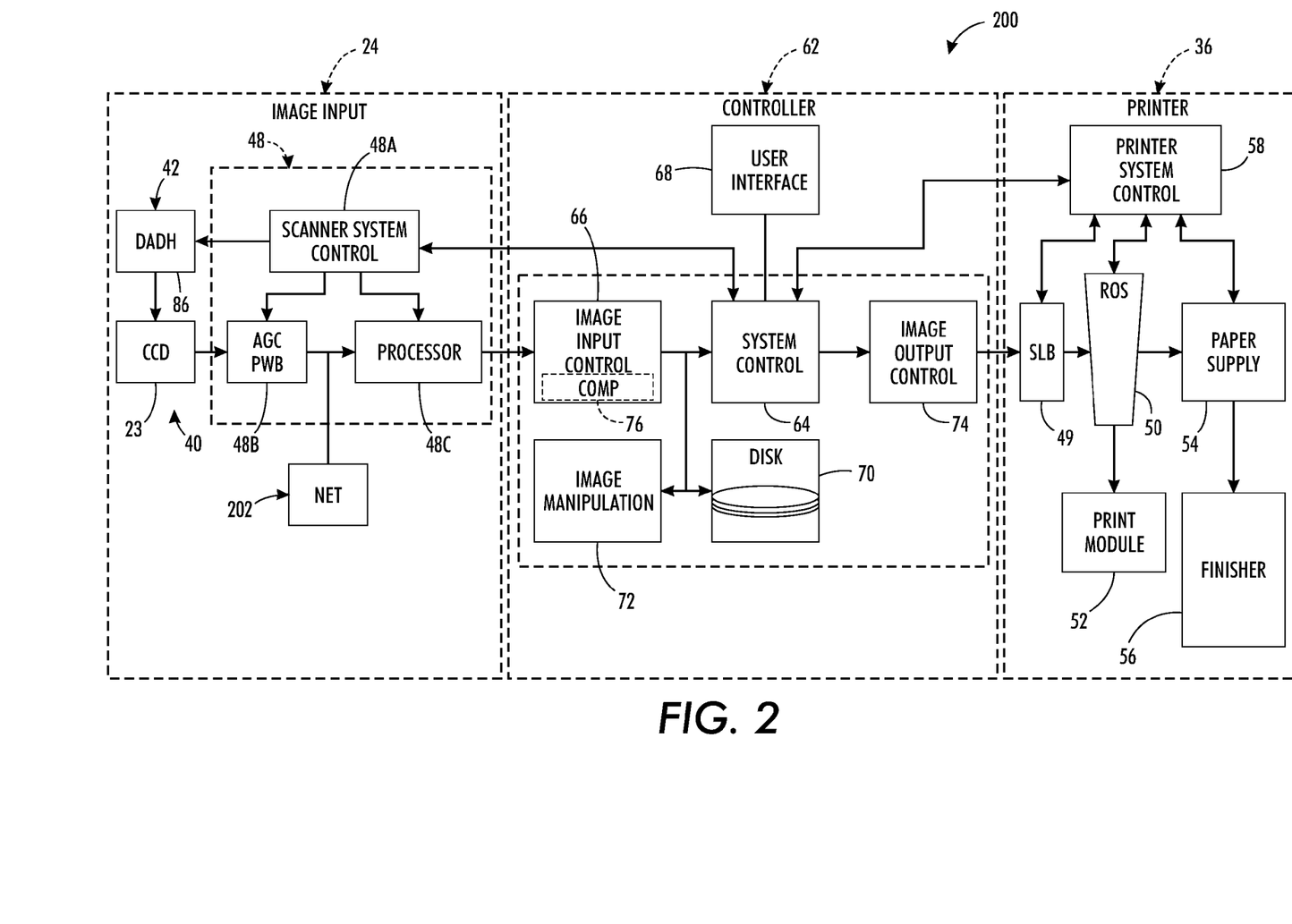
FIG. 2 is a block diagram depicting the major elements of a document handler in accordance to an embodiment.

FIG. 2 is a block diagram depicting the major elements of a document handler system 200 in accordance to an embodiment. The document handler system 200 is divided into image input section 24, controller section 62, and printer section 36. The image input section 24 has both remote and on-site image inputs enabling the document handler to provide network, scan, and print services. Other system combinations may be envisioned such as a stand alone printing system with on-site image input (a scanner), controller, and printer; a network printing system with remote input, controller, and printer; among other configurations. A remote imaging arrangement would comprise image input section 24 with network 202 capabilities. Suitable communication channel like Ether-Net® connection enabling image data in the form of image signals or pixels from one or more remote sources to be input to system for processing. Where the Page Description Language (PDL) of the incoming imaging data is different than the PDL used by the document handler system 200, suitable conversion means (not shown) are provided. Other remote sources of image data such as streaming tape, floppy disk, video camera, among others are within the scope of this invention.

For on-site image input section 24 has a document scanner section 40 with a duplexing automatic document handler (DADH) 42 for the purpose of automatically and sequentially placing and locating sets of multiple documents for scanning. Scanner section 40 incorporates one or more linear light sensitive arrays 44 for reciprocating scanning movement below platen glass 86 and focused on a line-like segment of platen glass 86 and the document being scanned thereon. Array 23, which may utilize Charge-Coupled Device (CCD) technology or the like, provides image elemental signals or pixels representative of the image scanned which are input to processor 48 for processing or controller 62 through a suitable connection.

Processor 48 communicates with the controller section 62 includes a scanner system control 48*a*, an automatic gain control printing wiring board (AGCPWB) 48*b* and a processor 48*c*, AGCPWB 48*b* converts the analog image signals output by array 23 to digitally represented signals, and processor 48*c* processes the digital image signals as required to enable controller section 34 to store and handle the image in the form and order required to carry out the job programmed. After processing, the image signals are output to controller section 62. Image signals derived from network 202 are similarly input to processor 48*c*. Processor 48*c* also provides enhancements and changes to the image signals such as filtering, thresholding, screening, cropping, scaling (reduction/enlargement), and the like. Following any changes and adjustments in the job program which affect these image processing parameters, the document must be rescanned to capture the specified modification.

The Printer section 36 comprises a laser type printer having a Scan Line Buffer 49, Raster Output Scanner (ROS) 50, Print Module 52, Paper Supply 54, Finisher 56, and Printer System Control 58. ROS 50 has a two beam laser with the beams modulated in accordance with the content of an image signal input by acousto-optic modulator to provide dual imaging beams which are scanned across a moving photoreceptor of Print Module 52 by means of a rotating polygon. This exposes two image lines on the photoreceptor with each scan to create the latent electrostatic images represented by the image signal input to the modulator.

Printer system control 58 automatically and precisely controls all the printer functions and operations in accordance with job program parameters received from system control 64 of controller section 62, as well as from internally derived signals from sensors and processes within the printer section 36. Printer system control signals are derived and distributed via a plurality of printed wiring boards (PWBs) in a multiprocessor architecture characterized by multiple microprocessor controller cores, serially interconnected, and also serially linked to more numerous input/output processing circuit PWBs. Controller section 62 is, for explanation purposes, divided into an image input control 66, User Interface (UI) 68, system control 64, main memory 70, image manipulation section 72, and image output control 74. The units 66, 64, 70, 72, 74 comprise a system which may also generally be referred to as the "Electronic Subsystem" (ESS). The scanned image data input from processor 48c of scanner section 40 to controller section 34 is compressed by image compressor/processor 67 of image input control 66 and placed in an image file. Image files, which represent different print jobs, are temporarily stored in system memory (not shown) pending transfer to main memory 70 where the data is held pending use.

The computer-accessible medium or main memory 70 stores machine operating system software, machine operating data, and the scanned image data currently being processed. When the compressed image data in main memory 70 requires further processing, or is required for display on touch screen 76 of UI 68, or is required by printer section 36, the data is accessed in main memory 70. Where further processing other than that provided by processor 48 is required, the data is transferred to image manipulation section 72 where the additional processing steps such as collation, make ready (document editing), decomposition, rotation, and the like are carried out. Following processing, the data may be returned to main memory 70 sent to UI 68 for display on touch screen 76, or sent to image output control 74.

Figure 3:
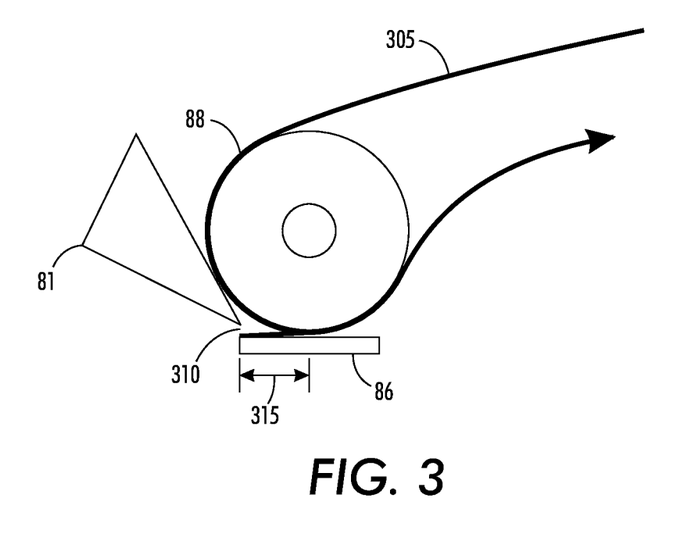
FIG. 3 is an illustration of a document drop or flick that gives rise to a lightness change in accordance to an embodiment.

FIG. 3 is an illustration of a document drop 300 or flick that gives rise to a lightness change in accordance to an embodiment. FIG. 3 is a side view of the CVT Roll and the trail edge exit guide as the document leaves the guide. When the edges of a document pass over the edge guide 81 near the constant velocity transport (CVT) roll 88, the document springs away from the normal cylindrical path 305. The document springing causes the paper to drop 310 or flick producing a lightness change in the edge region of the paper. The lightness change is measurable and predictable due to changes in illumination angle and due to integrating cavity effect (ICE). The length 315 of the lightness change measures around 8 mm to 15 mm at the trailing and leading edge of the document although this can be any distance depending on the specific construction of the DADH system.

Figure 4:
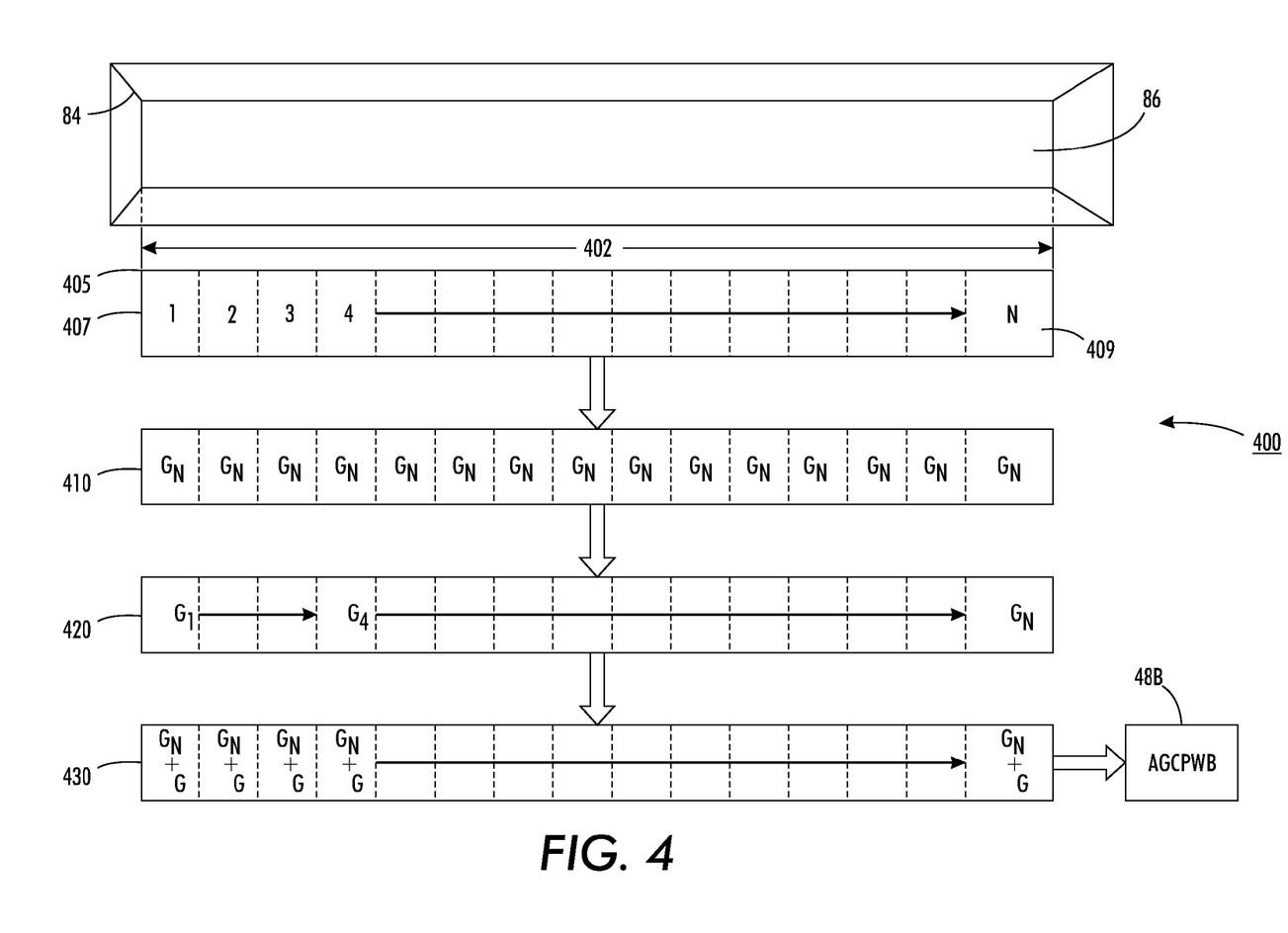
FIG. 4 illustrates gain adjusting to correct illumination defects in accordance to an embodiment.

FIG. 4 illustrate gain adjusting 400 to correct illumination defects in accordance to an embodiment. The selected document is fed downstream in a document feeding and inverting loop path 82 (FIG. 1) to the imaging station 84 which is a small area of the upper surface of the stationary platen glass 86, against which the moving document is held down by a roller 88 (FIG. 1), while the document is being sequentially imaged through the platen glass 86 by the imager, here the raster input scanner 24 (FIG. 1). FIG. 4 illustrates a process by which the processing circuit 48 adjusts the gain profile of a particular scan to make the optical response more uniform during the scan. As shown directly the scanned document or virtual document can be divided into a plurality of different segments 405 along its length 402. The document itself is not physically divided into segments, but rather the internal representation of the document within the processing circuit 48 is divided into segments as shown. At a minimum the number of segments is three: a leading edge region 409, trailing edge region 407, and a central region that is between the leading and trailing edge region. Although three is the preferred number of segments any number of segments can be used. Whatever the number of segments used, they can be distributed along the length 402 of the document as shown or in some other manner. For example, the segments can be positioned using an exponential or logarithmic spacing scheme that would compress the numbered segments closer to the leading and trailing edges, and thus lengthen the central region.

In operation, the gain for a particular image scan is set to some baseline value $G_N$ 410. This value is then stored in nonvolatile memory (NVM) and used as a baseline. The value of $G_N$ can be determined, for example, using an automatic gain control (AGC) system that makes gain adjustments from scan to scan, depending for example, on the distance between the scanner and the document being imaged; generally, the value of $G_N$ will change if the document is close or higher if the document is farther from the scanner. The mean and variance are determined for each segment and compared to the baseline value. Through statistical analysis, the uniformity of each is computed and compared to the baseline. From the comparison a gain correction is determined. As the scanning beam traverses the segments of the scan window, a gain correction $\Delta G$ 420 is added to the baseline gain for each segment, such that the gain is changed for each segment ($G=G_N+\Delta G$) 430. It should be noted that the gain correction can be multiplicative and can be formulated so that they are factors that multiply the baseline gain ($G_N$), instead of being added to the baseline gain. There usually will be no correction to the baseline gain ($G_N$) in the central region since the gain in that segment is already presumed to be at the desired value or with no illumination defects.

The gain corrections $\Delta G$ will generally be symmetrical about the edge regions, such that $\Delta G$ near the leading edge 409 of the scanned document will be approximately equal to $\Delta G$ at the trailing edge 407. However, this need not always be the case; it is entirely possible that the gain corrections may be asymmetrical. The automatic gain control (AGC) correction parameters are sent to a nonvolatile memory (NVM) for storing so it could be applied to a corresponding edge region when performing a scan. The correction parameters can be measured during scanner final test and recorded in an NVM in AGCPWB 48b board. It should be noted that AGC works normally throughout the document and this correction $\Delta G$ is a correction factor to the AGC target for the DADH defects.

Figure 5:
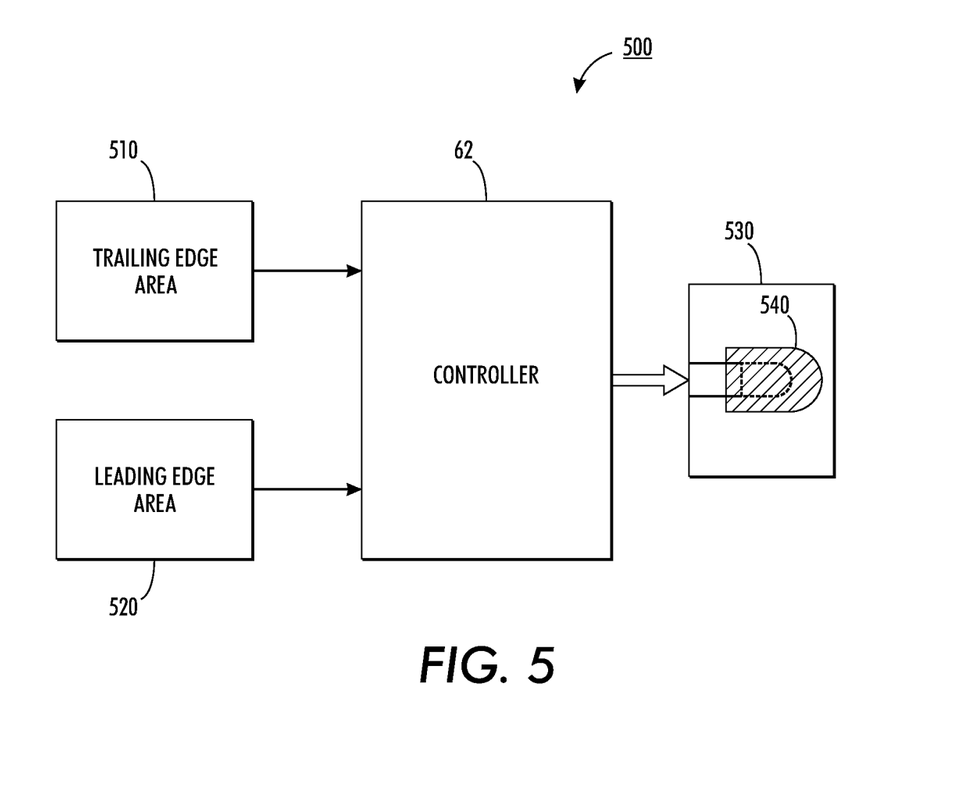
FIG. 5 is a block diagram that illustrates adjusting light intensity to correct illumination defects in accordance to an embodiment.

FIG. 5 is a block diagram that illustrates adjusting light intensity 500 to correct illumination defects in accordance to an embodiment. A controller 62 receives the area of the document that corresponds to the trailing edge 510 and the leading 520 to generate a control signal changes the intensity 540 of the light source 530. Controller 62 can change the frequency slightly to alter the brightness of the light source relative to the lead edge or trailing edge of the document. The light source 530 such as a hot or cold cathode fluorescent lamp known in the art, irradiates the light signal 540 to the required intensity corresponding to the control signal.

Figure 6:
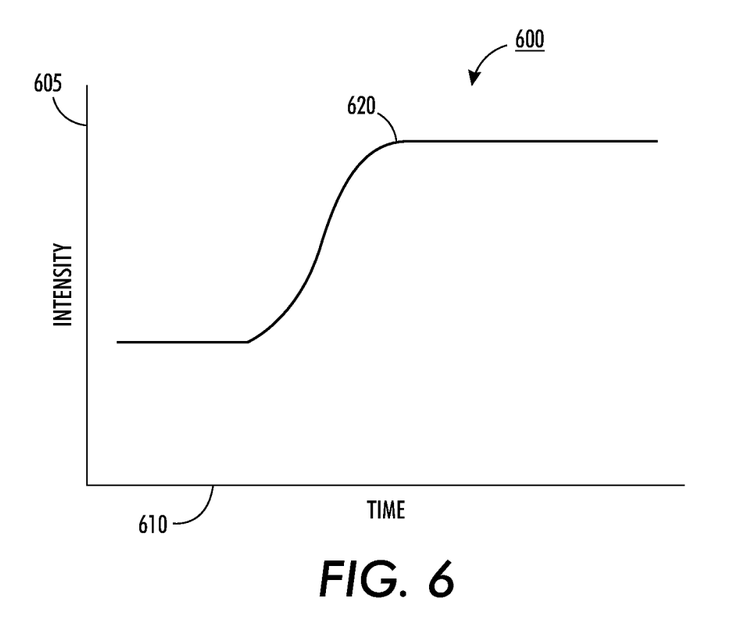
FIG. 6 is an illustrates diagrammatically a lamp intensity change or gain change in accordance to an embodiment.

FIG. 6 diagrammatically illustrates a lamp intensity change or gain change 600 in accordance to an embodiment. The illustration shows that the intensity 605 could be gradually changed 620 over a time 610 horizon or rise time to a higher intensity setting.

Figure 7:
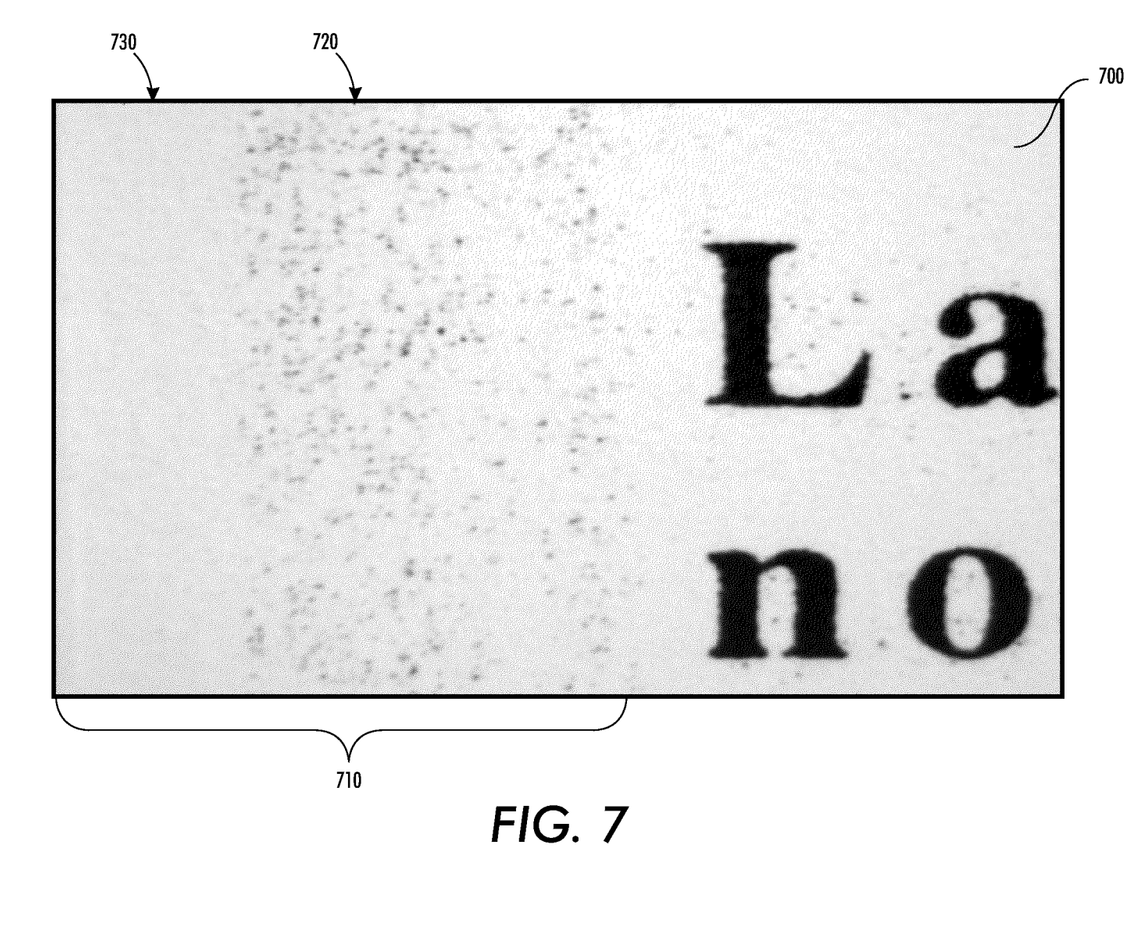
FIG. 7 illustrates the reproduction of text with and without illumination defects in accordance to an embodiment.

FIG. 7 illustrates the reproduction of text 700 with and without illumination defects in accordance to an embodiment. In edge region 710 a section is shown with the illumination defect 720 and the illumination defect erased 730. The integrating cavity effect (ICE) tends to make the imaged document appear darker (720). Adjustment of the gain or changing the frequency of the light source would make the document lighter (730).

Figure 8:
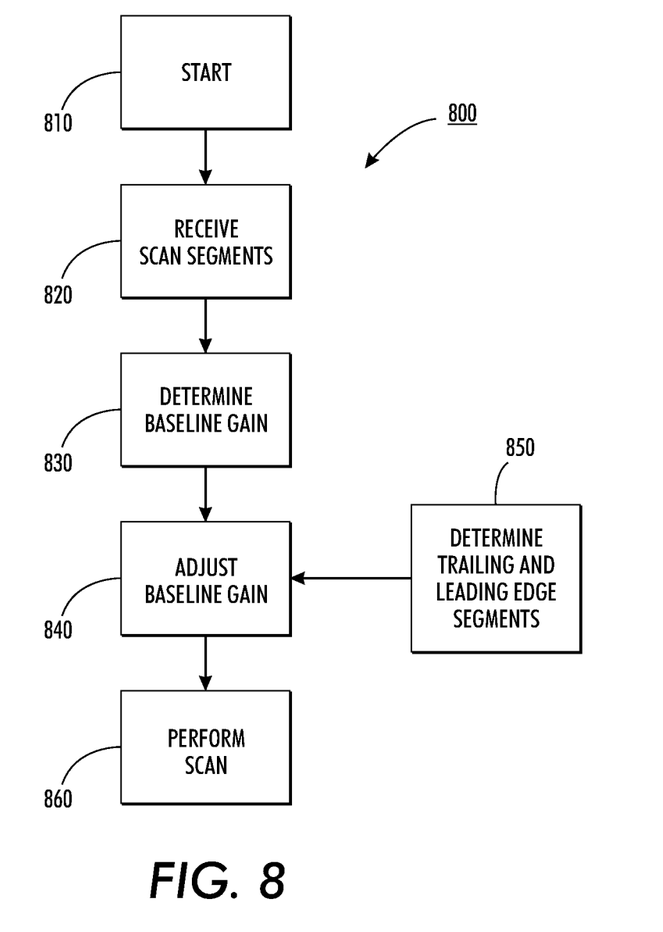
FIG. 8 is a flow chart depicting steps involved in automatic gain control to correct illumination defects in accordance to an embodiment.

FIG. 8 is a flow chart depicting method 800 automatic gain control to correct illumination defects in accordance to an embodiment. Method 800 begins with action 810 which starts the process. In action 820 scan segments are received. The pixel values for the leading edge region 409, trailing edge region 407, and a central region are received by method 800. In action 830 the baseline gain for the scanned document is determined. The baseline gain can be a single value of intensity or the mean and variance of intensity for the document. In action 840, an adjustment of the baseline gain is made for at least one edge region. The gain for the trailing edge and leading edge is made. This adjustment can be based on a predetermined value, threshold value, or based on the mean and variance of the intensity. For example, the threshold value could be set to suppress light intensity that exceeds a particular luminance level. In action 850, the location and intensity value of the trailing and leading edge segments are determined. The data from action 850 is then used in action 840 to adjust baseline gain. In action 860, the automatic gain control (AGC) correction parameters are used by document handler 100 to perform scanning of documents.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method to correct illumination defects by a scanning assembly in a document handler for repeatedly presenting documents to the platen of a copier, the scanning assembly including a housing with a light source and a mirror disposed in a cavity, the method comprising:
   acquiring illumination intensity of at least one edge region of the document, wherein illumination defects caused by document springing are produced on the at least one edge region of the document;
   determining the illumination defects in at least one edge region based on the illumination intensity of the document and the acquired illumination intensity of the at least one edge; and
   applying illumination defect correction to scans performed by the scanning assembly based on the determined illumination defects.

2. The method according to claim 1, wherein applying illumination defect correction to scans performed by the scanning assembly is selecting at least one of applying correction to the scanning assembly, and adjusting brightness at the light source.

3. The method according to claim 1 wherein automatic gain control (AGC) correction is applying a plurality of gain corrections to an optical detector in the scanning assembly, each gain correction corresponding to one of the at least one edge region.

4. The method according to claim 3, wherein in adjusting the gain of the optical detector comprises adjusting the gain within a defined distance of a leading edge or a trailing edge on the document.

5. The method according to claim 3, wherein applying a gain correction involves recalling a stored gain correction and applying the gain correction to a corresponding at least one edge region.

6. The method according to claim 2, wherein the at least one region is at least one region that is within 2 cm from the edge of the document.

7. The method according to claim 2, wherein an illumination defect is a lightness change due to deviation from a normal path by the document, wherein the deviation from the normal path causes a change in an angle of illumination formed between the document and the light source.

8. The method according to claim 2, wherein illumination defects is determined by comparing the illumination intensity of the at least one edge region to a threshold illumination intensity.

9. An automatic document handling system, comprising:
   an imaging area;
   a light source located in proximity to the imaging area;
   an imaging scanning system located in proximity to the imaging area;
   a document path, located in proximity to said imaging area, having an entrance and an exit, the exit of the looped document path being positioned such that an exiting document is placed upon the imaging area a second time;
   a memory that stores executable instructions capable of directing a processor to correct illumination defects; and
   a processor that executes the executable instructions to correct the illumination defects when receiving a print command by:
   acquiring data about illumination defects in at least one edge region of the document, wherein document springing produces on the at least one edge region of the document an illumination defect; and
   applying illumination defect correction to scans performed by the imaging scanning system based on the acquired data about illumination defects.

10. The automatic document handling system according to claim 9, wherein applying illumination defect correction to scans performed by the imaging scanning system is selecting at least one of applying correction to the imaging scanning system, and adjusting brightness at the light source.

11. The automatic document handling system according to claim 9 wherein automatic gain control (AGC) correction is applying a plurality of gain corrections to an optical detector in the imaging scanning system, each gain correction corresponding to one of the at least one edge region.

12. The automatic document handling system according to claim 11, wherein in adjusting the gain of the optical detector comprises adjusting the gain within a defined distance of a leading edge or a trailing edge on the document.

13. The automatic document handling system according to claim 11, wherein applying a gain correction involves recalling a stored gain correction and applying the gain correction to a corresponding at least one edge region.

14. The automatic document handling system according to claim 10, wherein the at least one region is at least one region that is within 2 cm from the edge of the document.

15. The automatic document handling system according to claim 10, wherein an illumination defect is a lightness change due to deviation from a normal path by the document, wherein the deviation from the normal path causes a change in an angle of illumination formed between the document and the light source.

16. The automatic document handling system according to claim 10, wherein illumination defects is determined by comparing an illumination intensity of the at least one edge region to a threshold illumination intensity.

17. An automatic document handling system, comprising:
   an imaging area;
   a light source located in proximity to the imaging area;
   an imaging scanning system located in proximity to the imaging area, wherein the image scanning system includes a housing with the light source and a mirror disposed in a cavity;
   a document path, located in proximity to said imaging area, having an entrance and an exit; and a computer-accessible medium having executable instructions to correct illumination defects, the executable instructions capable of directing a processor to perform:

acquiring illumination intensity of at least one edge region of the document, wherein document springing produces on the at least one edge region of the document an illumination defect;

determining the illumination defects in at least one edge region based on the measured illumination intensity of the document and the acquired illumination intensity of the at least one edge;

applying illumination defect correction to scans performed by the scanning assembly based on the determined illumination defects;

wherein applying illumination defect correction to scans performed by the imaging scanning system is selecting at least one of applying correction to the imaging scanning system, and adjusting brightness at the light source.

18. The automatic document handling system according to claim 17 wherein automatic gain control (AGC) correction is applying a plurality of gain corrections to an optical detector in the imaging scanning system, each gain correction corresponding to one of the at least one edge region.

19. The automatic document handling system according to claim 18, wherein in adjusting the gain of the optical detector comprises adjusting the gain within a defined distance of a leading edge or a trailing edge on the document.

20. The automatic document handling system according to claim 18, wherein applying a gain correction involves recalling a stored gain correction and applying the gain correction to a corresponding at least one edge region;

wherein the at least one region is at least one region that is within 2 cm from the edge of the document;

wherein illumination defects is determined by comparing an illumination intensity of the at least one edge region to a threshold illumination intensity.

* * * * *